(12) United States Patent
Shumizu

(10) Patent No.: US 7,603,777 B2
(45) Date of Patent: Oct. 20, 2009

(54) STEPLESS SPEED CHANGER AND ELECTRIC SHAVER USING THE SAME

(75) Inventor: Tetsuhiko Shumizu, Matsumoto (JP)

(73) Assignee: Izumi Products Company, Nagano (JP)

( * ) Notice: Subject to any disclaimer, the term of this patent is extended or adjusted under 35 U.S.C. 154(b) by 110 days.

(21) Appl. No.: 11/982,770

(22) Filed: Nov. 5, 2007

(65) Prior Publication Data

US 2008/0104846 A1    May 8, 2008

(30) Foreign Application Priority Data

Nov. 6, 2006    (JP) ................................ 2006-299806

(51) Int. Cl.
    *B26B 19/28*    (2006.01)
(52) U.S. Cl. .................. 30/45; 30/43.6; 30/43.92; 474/136
(58) Field of Classification Search ............. 30/43.5, 30/43.6, 43.8, 43.9, 43.91, 43.92, 45; 474/37, 474/136
    See application file for complete search history.

(56) References Cited

U.S. PATENT DOCUMENTS

| 2,338,700 | A | * | 1/1944 | Wilholt et al. ............... 30/43.6 |
| 2,352,909 | A | * | 7/1944 | Naegeli ..................... 30/34.05 |
| 3,935,751 | A | * | 2/1976 | Lee .............................. 474/50 |
| 4,329,888 | A | * | 5/1982 | Falzoni ....................... 475/204 |
| 5,687,481 | A | * | 11/1997 | De Boer et al. ............ 30/43.1 |
| 5,692,303 | A | * | 12/1997 | Garenfeld et al. ............ 30/43.9 |
| 6,120,399 | A | * | 9/2000 | Okeson et al. ................ 474/14 |
| 6,743,129 | B1 | * | 6/2004 | Younggren et al. ........... 474/19 |
| 2007/0004543 | A1 | * | 1/2007 | Ishida .......................... 474/8 |
| 2008/0104846 | A1 | * | 5/2008 | Shimizu ........................ 30/45 |

FOREIGN PATENT DOCUMENTS

| DE | 20 21 027 | | 12/1970 |
| EP | 0 323 824 | | 7/1989 |
| EP | 0 543 460 | | 5/1993 |
| JP | 47-962 | | 1/1972 |
| JP | 47-1242 | | 1/1972 |
| JP | 2008-115948 A | * | 5/2008 |
| WO | WO 95/32844 | | 12/1995 |

* cited by examiner

*Primary Examiner*—Hwei-Siu C Payer
(74) *Attorney, Agent, or Firm*—William L. Androlia; H. Henry Koda

(57) ABSTRACT

A toroidal type stepless speed changer including input and output disks (10) and (12), power rollers (20) provided between the disks with supporting shafts (28) thereof outwardly protruding, a single movable ring (30) with which the outer ends of the power roller supporting shafts (28) are engaged, the single movable ring being movable in the direction of the disk center shaft (14) with turning thereof being restricted, and a single adjustment belt (48) capable of making reciprocal motion in its turning (circumferential) direction so as to move the movable ring (30) along to disk center shaft. By the movement of the movable ring (30) in the disk center shaft direction that is caused by the reciprocal motion of the adjustment belt (48), the inclination of all the power roller supporting shaft is varied, thus changing the rotational speed between the input and output disks.

7 Claims, 6 Drawing Sheets

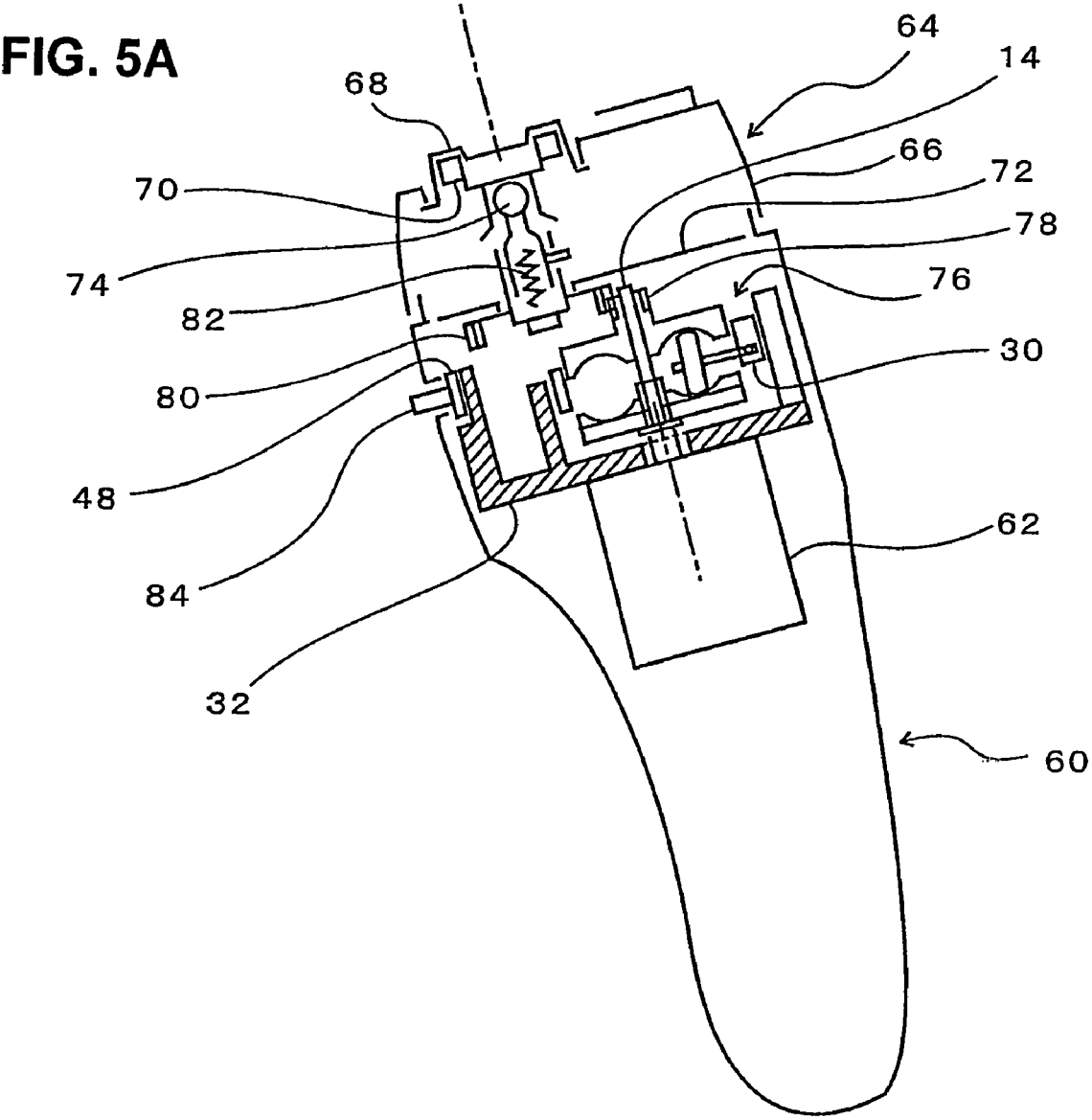

STEPLESS SPEED CHANGER AND ELECTRIC SHAVER USING THE SAME

BACKGROUND OF THE INVENTION

1. Field of the Invention

The present invention relates to a toroidal type stepless speed changer of simple structure and smaller size and further relates to an electric shaver that uses the same.

2. Description of the Related Art

In the so-called toroidal type stepless speed changer, ring-shaped concave surfaces (toroidal surfaces) are formed respectively in the opposing surfaces of input and output disks which are installed in opposition, and a plurality of disks (power rollers) are provided or sandwiched between the two concave surfaces as disclosed in Japanese Patent Application Publication (Kokoku) Nos. 47-962 and 47-1242. This type of speed changer, which uses the shear forces of oil films formed between the concave surfaces and the power rollers to transmit motive power, varies the speed-change ratio by synchronously changing the inclination of the plurality of power rollers.

In the structure described in Japanese Patent Application Publication (Kokoku) No. 47-962, the mechanism for changing the inclination of the power rollers is very complex, and it requires a great number of parts. It is thus not easy to make it small in size. For this reason, it is extremely difficult to apply this art in such a small electric appliance as electric shavers.

In apparatuses such as electric shavers, meanwhile, it is desirable that the rotational speed of the inner cutter (in a rotary type shaver) or the reciprocating speed of the inner cutter (in a reciprocating type shaver) be adjusted to the preference of the user. With the conventional art, however, the speed is determined by the rotational speed of the motor or by a speed balancing the size of the load. For this reason, it has not been possible to set speeds to match the preference of the user.

Controlling the rotational speed of the motor is conceivable; however, in that case, it becomes necessary to use a special motor, and the control circuit becomes complex. As a result, the mechanism becomes expensive or large in size and cannot be used in small electric appliances such as electric shavers.

BRIEF SUMMARY OF THE INVENTION

Accordingly, the first object of the present invention, which was devised in view of such circumstances as described above, is to provide a stepless speed changer that has a simple structure and involves a small number of parts and can be smaller in size and further is suitable for such small electric appliances as electric shavers.

The second object of the present invention to provide an electric shaver that, using an inexpensive motor and without using a special motor or control circuit, can be operated at a rotational speed preferred by the user.

The above-described first object is accomplished by a unique structure of the present invention for a stepless speed changer that includes a plurality of power rollers provided between ring-shaped concave surfaces formed respectively in the opposing surfaces of rotation input and output disks for varying the speed-change ratio by varying the inclination of the turning surfaces of these power rollers within a plane that includes the center axes of the disks; and in the present invention:

the power rollers are formed with power roller supporting shafts which are on the turning center axis of the power rollers and protrude from between the opposing surfaces of the input and output disks to the outside in the radial direction of the disks;

a single movable ring is provided so as to enclose the outside of at least the input disk with the outer ends of all of the power roller supporting shafts being engaged therewith, the movable ring being movable in parallel with the disk center shaft with the turning thereof being restricted; and a single adjustment belt is provided so as to enclose the movable ring and to be held by a frame body so that it can reciprocate (or slide back and forth) by prescribed amounts in the direction of turning and so that the movable ring is moved in parallel with the disk center shaft by this reciprocal motion of the adjustment belt; and wherein the inclination of all of the power roller supporting shafts is varied by the movement of the movable ring in the center axis direction which is caused by the adjustment belt shifted back and forth.

The above-described second object is accomplished by a unique structure of an electric shaver of the present invention that includes the stepless speed changer described above, and in the present invention, the shaver is comprised of:

a shaver main body that houses a motor;

a cutter unit having an outer cutter and an inner cutter and detachably mounted to the upper part of the shaver main body;

the above-described stepless speed changer mounted in the shaver main body so that it is between the cutter unit and motor and it varies the speed of rotation outputted by the motor and transmits this varied rotation (or rotational force) to the inner cutter; and a regulator provided so as to be operated from outside of the shaver main body, thus adjusting the position of the adjustment belt of the stepless speed changer.

In the stepless speed changer of the present invention, the movable ring is moved in parallel with the disk center shaft (or moved vertically) when the adjustment belt is moved in the circumferential direction (horizontally), and the inclination of the plurality of power roller supporting shafts engaging this movable ring is synchronously varied to effect speed changes. Accordingly, the structure is simple. In other words, because the plurality of power roller supporting shafts are engaged with one movable ring, it is possible to vary the inclination of all of the power roller supporting shafts simultaneously and at the same angle by moving the movable ring. As a consequence, the stepless speed changer requires a smaller number of parts and can be smaller in size.

When the stepless speed changer of the present invention is applied to a small electric appliance such as an electric shaver, since the speed controller is provided so that the position of the adjustment belt is adjusted from the outside of the main body of the electric appliance (or of the shaver), the user can operate the electric appliance at the speed of his or her preference by manipulating this speed controller. Accordingly, special speed-controllable motor and control circuit are not required, and an inexpensive motor can be used.

In the present invention, various mechanisms can be employed for converting the reciprocal motion of the adjustment belt in the turning direction to a movement of the movable ring in a direction parallel to the center shaft of the disks. For example, in the present invention, a protrusion is provided in one of the two opposing surfaces of the adjustment belt and movable ring (or in the movable ring), an inclined channel into which this protrusion engages is engaged is provided in the other thereof (or in the adjustment belt), and the direction of movement of the protrusion is made perpendicular to the direction of movement of the inclined channel. This structure is very simple, In addition, in the present invention, the movable ring is held on a plurality of circular arc-shaped standing walls which are erected on a frame body and divided in the circumferential direction. With this structure, it is possible to make the movable ring capable of making movement in parallel with the disk center shaft while engaging it in the gaps in the standing walls to restrict the circumferential turning thereof, and, in conjunction therewith, the power roller supporting shafts pass through these gaps to the outside and are engaged with the movable ring, thus providing a simple structure.

In small electric appliances, the rotation of a motor rotating at constant speed is speed-reduced by, generally, a gear speed changer of a constant speed reduction ratio. In the present invention, the input disk is made smaller in diameter than the output disk, and the power roller supporting shafts are provided so as to incline toward the input disk side from the horizontal position (a direction substantially perpendicular to the disk center shaft and a direction in which the speed-change ratio becomes 1:1). In this structure, the power rollers will not make contact with the outer circumferential side of the concave surface of the input disk, as a result, the outer diameter of the input disk can be reduced so as to be coincident with the outer circumferential side of the concave surface. Accordingly, by way of providing the movable ring at a position where it encloses the outside of this diameter-decreased input disk, it is possible to decrease the diameter of the movable ring and to make the overall size of the speed changer much smaller.

In the present invention, further, the electric shaver can be a rotary type or a reciprocating type. For the rotary type, a plurality of substantially disk-shaped outer cutters and substantially pinwheel shaped inner cutters are provided in a cutter unit, and the plurality of inner cutters are rotationally driven by the output disk of a single speed changer. For the reciprocating type, the cutter unit has such a structure that an inner cutter is made to contact with and slide in a reciprocating direction against the lower surface of the outer cutter that is substantially U-shaped when seen from the side, and the rotation of the output disk of the speed changer is converted to reciprocal motion to reciprocally drive the inner cutter.

The stepless speed changer of the present invention is applicable to various small electric appliances such as mixers, driers, electric toothbrushes, washing machines, and fans, for example.

BRIEF DESCRIPTION OF THE SEVERAL VIEWS OF THE DRAWINGS

FIG. 5A shows the internal structure of a rotary type electric shaver according one embodiment of the present invention, FIG. 5B being a top view thereof; and FIG. 6 is a top view representing a speed-changing speed controller and the like.

DETAILED DESCRIPTION OF THE INVENTION

Figure 1:
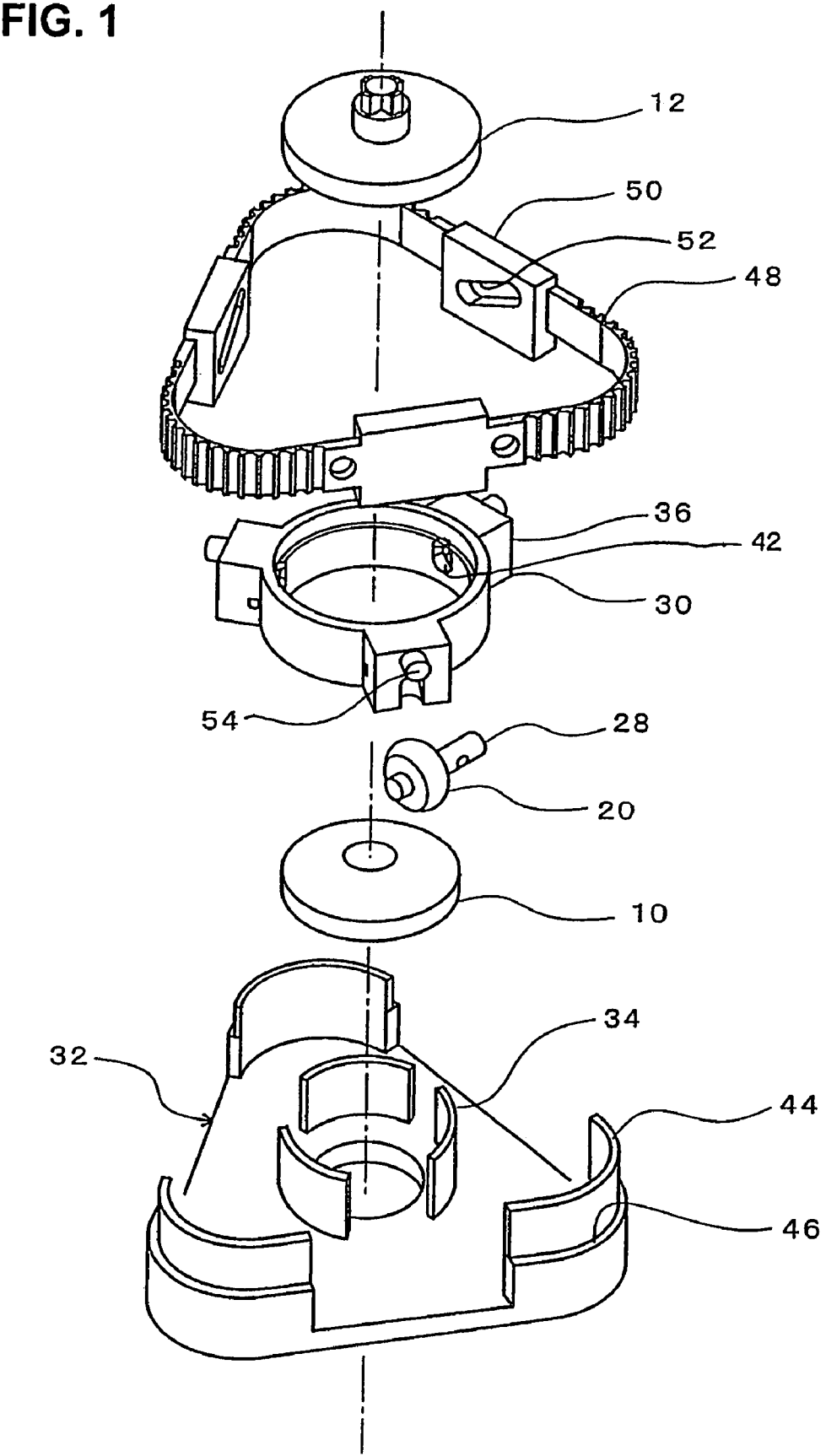
FIG. 1 is a disassembled perspective view of a speed changer according to one embodiment of the present invention.
Figure 2:
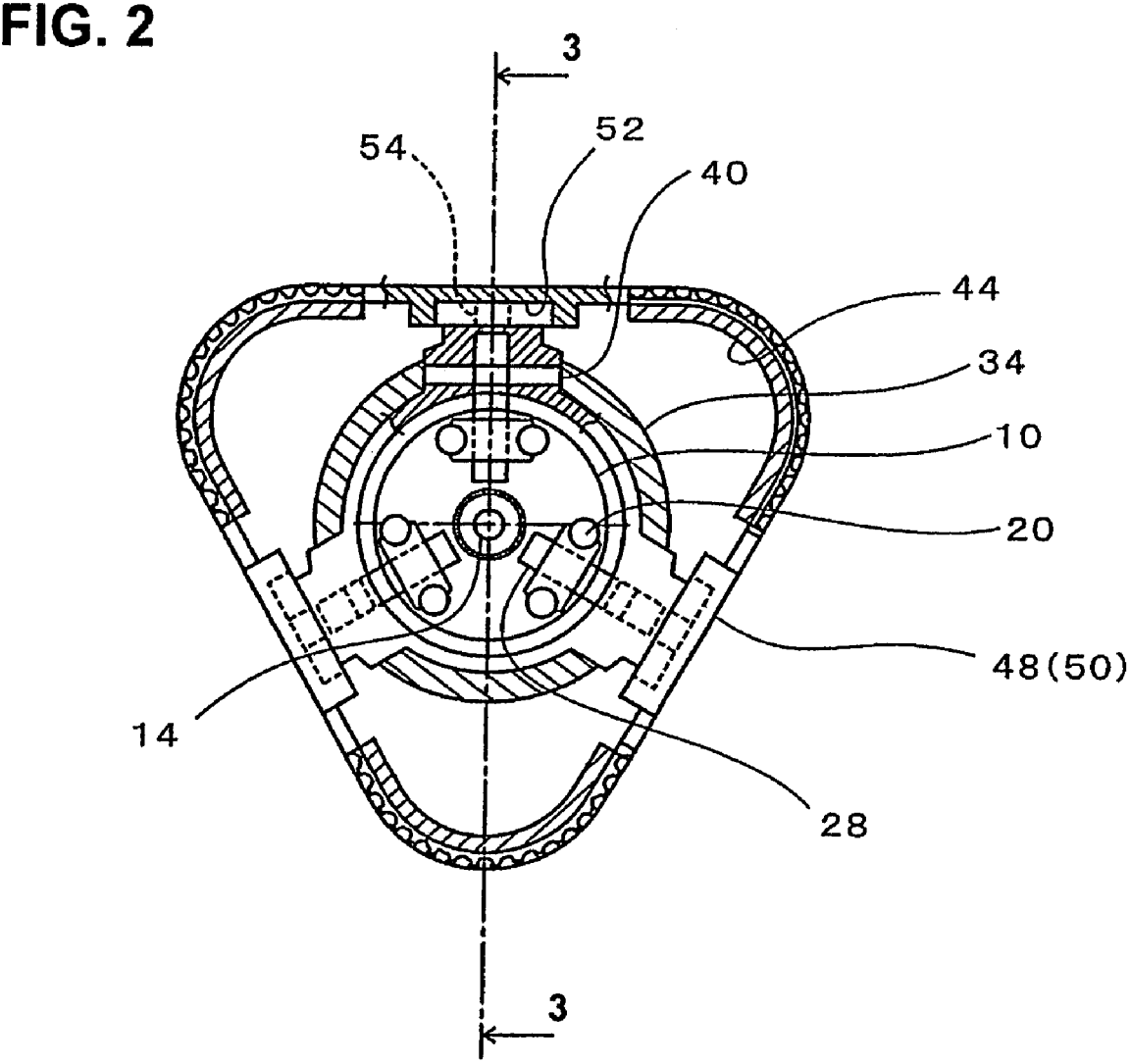
FIG. 2 is a top view of the speed changer in an assembled state.
Figure 3A:
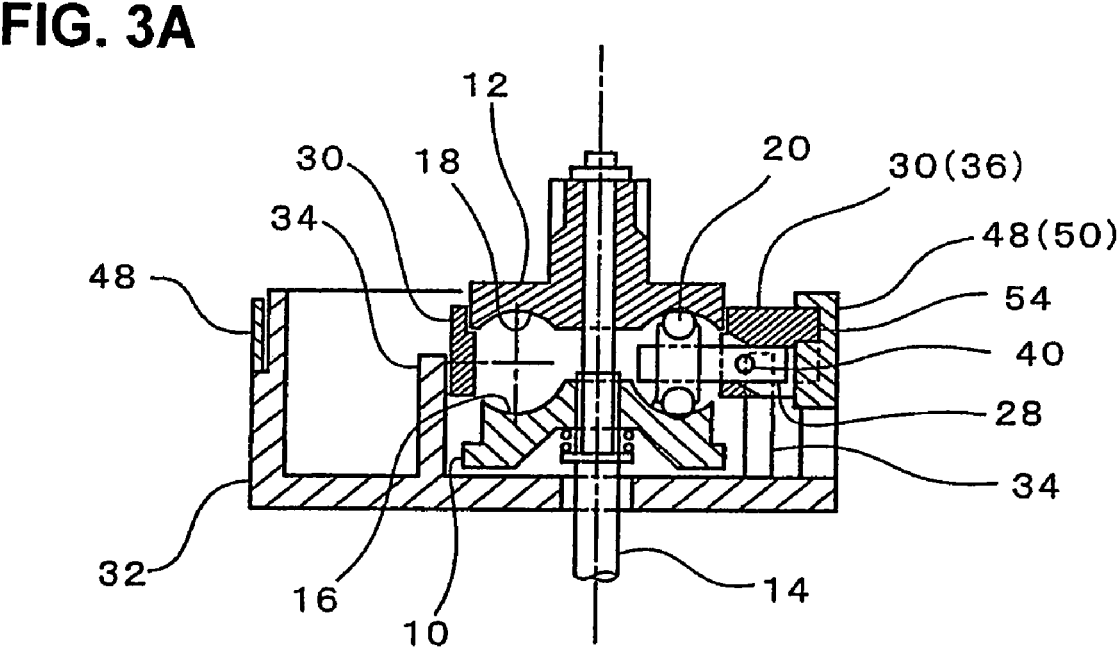
FIGS. 3A and 3B show cross-sections taken along the lines 3-3 in FIG. 2.
Figure 3B:
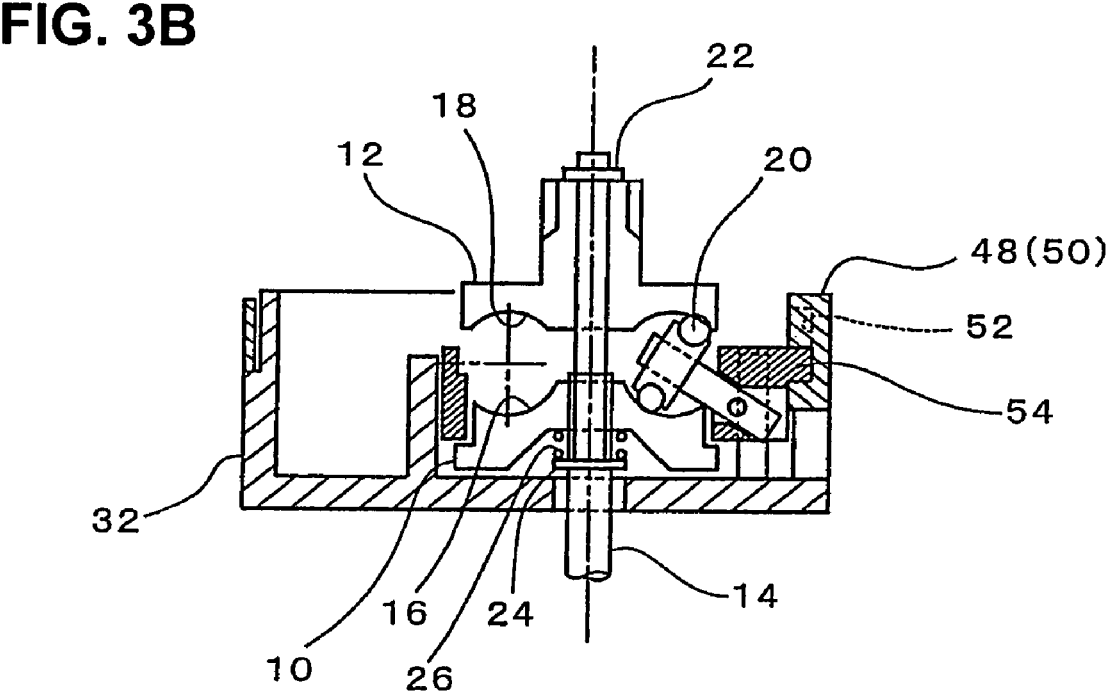
Figure 4A:
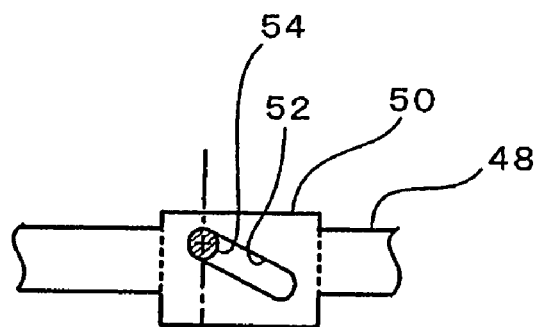
FIGS. 4A through 4C show the operations of the linking mechanism for the adjustment belt and the movable ring.
Figure 4B:
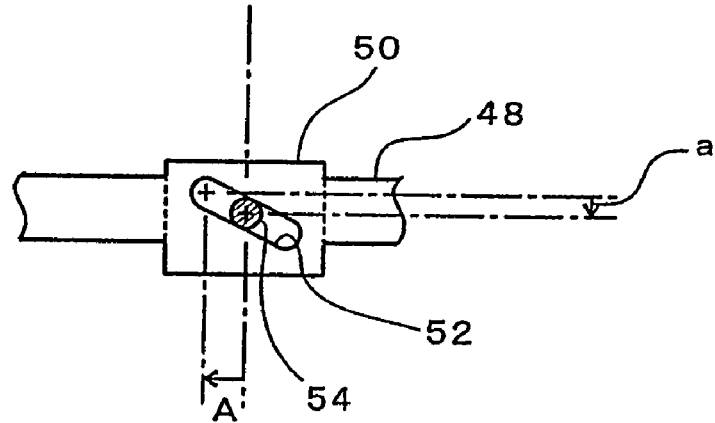
Figure 4C:
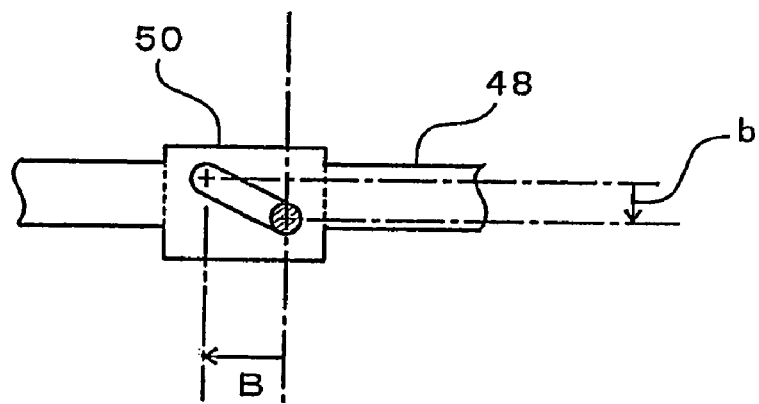

FIG. 1 is a disassembled perspective view of a speed changer according to one embodiment of the present invention, while FIG. 2 is a top view representing, in partial cross-section, the assembled condition of the speed changer with the output disk removed. FIGS. 3A and 3B show the cross-sections taken along the line 3-3 in FIG. 2, in which FIG. 3A shows the configuration that the speed-change ratio is 1:1, and FIG. 3B shows the configuration that the speed-change ratio is less than 1. FIGS. 4A through 4C illustrate the manner of movement of a linking mechanism for the adjustment belt and movable ring of the speed changer.

In FIGS. 1 through 3B, the reference numeral 10 designates a rotation input disk (hereinafter called simply the "input disk") and 12 a rotation output disk (hereinafter called simply "output disk"), which are axially supported by a common disk center shaft 14. The disk center shaft 14 is a rotary shaft of a motor secured to, for example, a frame body. To this disk center shaft 14, as shown in FIGS. 3A and 3B, the input disk 10 is spline-coupled, and the output disk 12 is axially supported thereby so as to rotate freely.

In the opposing surfaces of these input and output disks 10 and 12 are formed ring-shaped concave surfaces (toroidal surfaces) 16 and 18, respectively. More specifically, the concave surfaces 16 and 18 are of shapes that follow a common circle and are positioned on a circle centered on the disk center shaft 14. Between these concave surfaces 16 and 18, three power rollers 20 are provided or sandwiched, at equal intervals in the circumferential direction, and the input and output disks 10 and 12 are urged in mutually approaching directions so as to sandwich the power rollers 20 therebetween with a prescribed pressure.

More specifically, the output disk 12 has its upward (in FIGS. 3A and 3B) movement restricted by an upper retaining ring 22 secured to the disk center shaft 14, while to the input disk 10 is given an upward returning tendency by a compressed coil spring 26 that is compressed and mounted between this input disk 10 and a lower retaining ring 24 secured to the disk center shaft 14. As a consequence, the power rollers 20 are sandwiched between the concave surfaces 16 and 18 due to the spring force of the compressed coil spring 26. Since the input disk 10 is spline-coupled to the disk center shaft 14, it rotates integrally with the disk center shaft 14, and this rotation is transmitted to the output disk 12 by the turning motions of the power rollers 20.

The power rollers 20, as seen from FIG. 2, are held so that they can freely turn by power roller supporting shafts 28 which are on the center axes thereof (in other words, the power roller supporting shafts are perpendicular to the turning plane of the rollers). The three power roller supporting shafts 28 protrude from between the opposing surfaces of the input and output disks 10 and 12 to the outside of the disks in the radial direction of the disks. The outer ends (ends on the outside in the radial direction of the disks) of these three power roller supporting shafts 28 are engaged in a movable ring 30 that encloses (the outside of) the in put and output disks 10 and 12.

The movable ring 30, as shown in FIGS. 1 and 2, are provided so as to engage (or is enclosed inside) circular arc-shaped standing walls 34, which are erected on a frame body 32 and divided into three sections in the circumferential direction, so that the movable ring 30 is held and movable parallel to the disk center shaft 14 while the turning of the movable ring 30 (in its circumferential direction) is restricted. More specifically, in the outer circumference of the movable ring 30, three blocks 36 are formed so that they are inside the gaps in the circumferential direction of the three standing walls 34, and the circular arc-shaped outer circumferences located between the blocks 36 engage the inner circumferential surfaces of the three standing walls 34. As a result, the movable ring 30 is movable in parallel with the disk center shaft 14 (in the up-and-down or vertical direction in FIGS. 1, 3A and 3B) while the turning thereof (in its circumferential or horizontal direction) is restricted by the standing walls 34.

The outer ends of the power roller supporting shafts 28 are respectively coupled to the blocks 36 of the movable ring 30 by pins 40 so that they can turn freely in the up-and-down direction. More specifically, in the blocks 36, through-holes 42 are formed so that the power roller supporting shafts 28 respectively pass through them in the radial direction of the disk center shaft 14, and the pins 40 cross through these through-holes 42 and axially support the power roller supporting shafts 28. The through-holes 42, furthermore, as seen from FIGS. 3A and 3B, have the upper portions on the inner radial side and the lower portions on the outer radial side diagonally cut away. With this structure, the power roller supporting shafts 28 are pivotable between a horizontal position shown in FIG. 3A and a position in which they are inclined downward as shown in FIG. 3B.

When the power roller supporting shafts 28 (FIG. 3A) are horizontal or at the horizontal position, the input disk 10 and the output disk 12 rotate at the same speed (1:1). In the inclined position of the power roller supporting shafts 28 with the outer ends thereof descended (FIG. 3B), the output disk 12 is rotated with the rotation of the input disk 10 decelerated. As a consequence, the power rollers 20 will not roll against the part of the concave surface 16 of the input disk 10 that is on the outer radial side extremity. Accordingly, in the shown embodiment, a part of this concave surface 16 at the outer radial extremity is removed, so that the diameter of the input disk 10 is made smaller than that of the output disk 12. In conjunction therewith, moreover, the diameter of the lower part of the movable ring 30 is made smaller so as to correspond to the outer diameter of the input disk 10, thus effecting smaller size.

The above-described frame body 32 is, as seen from FIG. 1, substantially triangular when viewed from above, and its three corners are respectively made in a circular arc shape; and circular arc-shaped guide walls 44 are erected along these three corners. On the outer circumferential surfaces of these guide walls 44, guide rails 46 are formed at a prescribed height. An adjustment belt 48 is fitted on the guide rails 46 so that it can move reciprocally (or slide back and forth) in its length-wise direction (that is, in its circumferential direction). The adjustment belt 48 is comprised of sliding portions, which are guided by the guide rails 46 and are small in thickness and abundance of flexibility, and block units 50, which are great in thickness and positioned between two guide rails 46.

On the inner surfaces of the thick block units 50, respectively, inclined channels 52 are formed. These channels 52 are slanted in the same direction. Furthermore, on the outer circumferential surfaces of the blocks 36 of the movable ring 30, protrusions 54 are formed so that they protrude in the outer radial direction from above the through-holes 42. These protrusions 54 of the movable ring 30 are, respectively, engaged with the inclined channels 52 of the thick block units 50 of the adjustment belt 48. As seen from FIG. 4A, at equal rotational speed as shown in FIG. 3A, the protrusions 54 of the movable ring 30 are positioned at the upper ends of the inclined channels 52 of the blocks 50 of the adjustment belt 48.

When, from this condition, the adjustment belt 48 is moved or slid by a certain amount A as shown in FIG. 4B (clockwise in FIG. 1) to the left, the protrusions 54 of the movable ring 30 are guided toward the vicinity of the centers of the inclined channels 52, and descend by a certain amount a, and as a result, the movable ring 30 descends for the distance a. This condition is shown in FIG. 2. When the adjustment belt 48 is moved further in the same direction (or further to the left) by a certain amount B as shown in FIG. 4C from the position shown in FIG. 4A, the protrusions 54 are guided to the lower portions of the inclined channels 52, with the amount of descent of the protrusions 54 becoming b, and as a result, the movable ring 30 descends for the distance b. By moving the adjustment belt 48 in the opposite direction, the protrusions 54 of the movable ring 30 make opposite movements and return to the upper portions of the inclined channels 52, and the movable ring 30 thus ascends.

As seen from the above, the movable ring 30 is movable up and down by moving the adjustment belt 48 reciprocally or by sliding the adjustment belt 48 back and forth. As a consequence of the up-and-down movement of this movable ring 30, the inclination of the power roller supporting shafts 28 changes, the inclination of the turning surfaces of the power rollers 20 thus changes, and as a result the speed-change ratio between the input and output disks us changed. As seen from the above, since the three power rollers 20 can be synchronously inclined by the adjustment belt 48 and movable ring 30, the structure is extremely simple. For this reason, the number of parts can be small, and the overall size of the stepless speed changer can be smaller.

Figure 6:
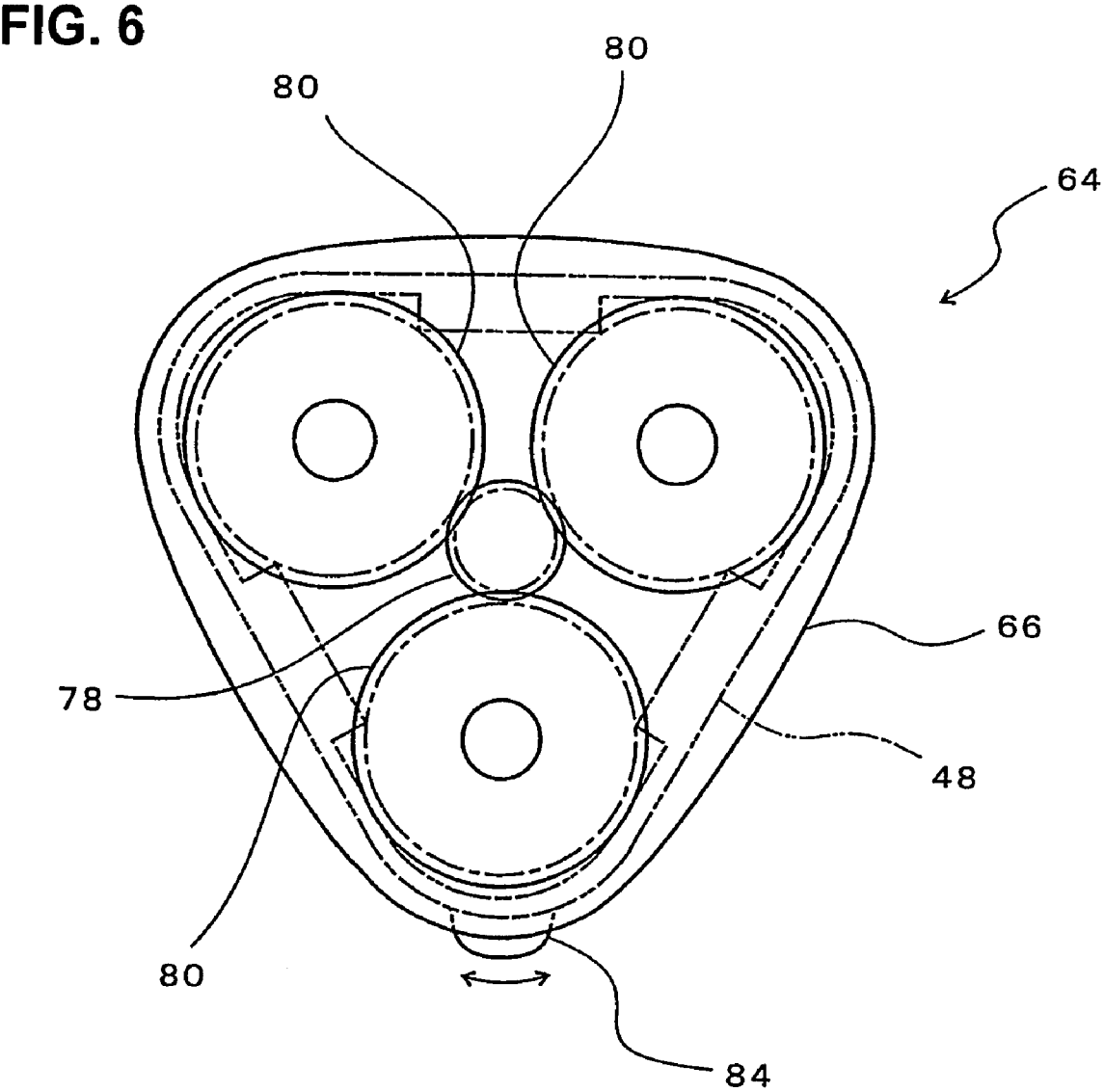

FIG. 5A shows the internal structure of a rotary type electric shaver that uses the stepless speed changer described above. FIG. 5B is a top view of FIG. 5A. FIG. 6 is a top view of a speed controller for rotational speed changes and other parts.

In FIG. 5A, the reference numeral 60 designates a shaver main body which houses, among other parts, an electric motor 62, control circuit, and switches. A cutter unit 64 is detachably mounted to the top or upper part of this shaver main body 60. The cutter unit 64 is comprised of an outer cutter case 66 that is substantially triangular as seen from above, three substantially disk-shaped outer cutters 68 held so as to be sinkable down with respect to the upper surface of the outer cutter case 66, and substantially pinwheel-shaped inner cutters 70 which respectively slide against the lower surfaces of the outer cutters 68. The outer cutters 68 and the inner cutters 70 make rotary blades.

In the shaver main body 60, a partition wall 72 is provided between the shaver main body 60 and the cutter unit 64, and (three) inner cutter drive shafts 74 that are rotated by the motor 62 are held by the partition wall 72. Below this partition wall 72, in other words, inside the shaver main body 60 between the cutter unit 64 and the motor 62, the stepless speed changer 76 described above (FIGS. 1 to 4C) is provided. The motor 62 and the frame body 32 of this stepless speed changer 76 are secured to the shaver main body 60, and the rotary shaft of this motor 62 passes through the frame body 32 to make the above-described disk center shaft 14. For the stepless speed changer 76 shown in FIG. 5A, the parts that are shown in FIGS. 1 to 4C are designated by the same reference numerals, and thus further descriptions thereof are omitted.

On the upper surface of the output disk 12, a drive gear (small gear) 78 is formed integrally. This drive gear 78 engages three driven gears (large gears) 80 that are respectively parallel with the inner cutter drive shafts 74 and are provided under the lower surface of the partition wall 72 (see FIG. 6). The inner cutter drive shafts 74 are provided on the driven gears 30 so that they are movable up and down, and to each one of the inner cutter drive shafts 74 is imparted an upward returning tendency by a coil spring 82 that is compressed and mounted between each inner cutter drive shaft 74 and the driven gear 80. The upper ends of the inner cutter drive shafts 74 are formed with polygonal engagement balls that engage in engagement holes of the inner cutters 70.

In the above-described structure, the rotational output force of the motor 62 is transferred through the stepless speed changer 76 and the drive gear 78 to the driven gears 80, and the rotation of these driven gears 80 is transmitted by the inner cutter drive shafts 74 to the inner cutters 70. The inner cutters 70 are pressed against the lower surfaces of the outer cutters 68 by the upward return force of the inner cutter drive shafts 74 which have the coil springs 82 installed inside. As a consequence, the inner cutters 70 are rotated while making a sliding contact with the lower surfaces of the outer cutters 68. Whiskers which have entered the hair induction holes (not shown) formed in the outer cutters 68 are cut by the rotating inner cutters 70.

To the adjustment belt 48 of the stepless speed changer 76, a speed controller 84 is secured so as to protrude to the outside of the shaver main body 60. This speed controller 84 protrudes outside from a laterally long opening opened in the front face of the shaver main body 60 and is manipulated so as to be moved left and right (as shown by arrow in FIG. 6) by the thumb of the hand of a user that is gripping the shaver main body 60. By shifting this speed controller 84 left and right, the adjustment belt 48 is moved or slid in its length-wise direction, and the movable ring 30 is as a result moved up and down. As a consequence, the rotational speed is adjusted to the preference of the user by varying the speed-change ratio (speed reduction ratio) between the input and output disks of the speed changer, changing the rotational speed of the inner cutters 70.

The present invention is applicable to a reciprocating electric shaver in addition to a rotary shaver described above. In a reciprocating shaver, the reciprocal blade comprises an outer cutter that is substantially U-shaped when seen from the side and an inner cutter that moves reciprocally to slide against the lower surface of the outer cutter, and the output disk of the stepless speed changer drives the inner cutter reciprocally.

The invention claimed is:

1. A stepless speed changer comprising
    a rotation input disk and a rotation output disk, and
    a plurality of power rollers provided between ring-shaped concave surfaces formed respectively in opposing surfaces of said input and output disks, said opposing surfaces varying a speed-change ratio by varying inclination of turning surfaces of said power rollers within a plane that includes a disk center shaft of said disks;
    said stepless speed changer further comprising:
        a power roller supporting shall which is provided on a turning center axis of each one of said power rollers and protrudes from between the opposing surfaces of said input and output disks to outside in a radial direction of said disks;
        a movable ring that encloses at least an outside of said input disk, in which outer ends of all of said power roller supporting shafts are engaged with said movable ring, said movable ring being movable in parallel with the disk center shaft while being restricted in turning; and
    an adjustment belt that encloses said movable ring, in which said adjustment belt being held by a frame body so as to make a reciprocal motion by prescribed amounts in a direction of turning thereof, and said adjustment belt moving said movable ring in parallel with the disk center shaft by said reciprocal motion thereof; and wherein
    inclination of all of said power roller supporting shafts is varied by movement of said movable ring in a direction of the disk center shaft caused by the reciprocal motion of said adjustment belt.

2. The stepless speed changer according to claim 1, wherein a protrusion is provided in opposing surfaces of one of said movable ring and said adjustment belt, and an inclined channel into which said protrusion engages is provided in the other of said movable ring and said adjustment belt.

3. The stepless speed changer according to claim 1, wherein the movable ring is held on a plurality of circular arc-shaped standing walls which are erected on said frame body and divided in a circumferential direction, so that the movable ring is restricted in turning thereof and is movable in parallel with the disk center shaft.

4. The stepless speed changer according to claim 1, wherein
    a diameter of said input disk is smaller than a diameter of said output disk, and
    said power roller supporting shafts are capable of inclining toward said input disk from a direction substantially perpendicular to the disk center shaft, thus providing speed-reduction.

5. An electric shaver including said stepless speed changer according to claim 1, said shaver comprising:
    a shaver main body that houses a motor;
    a cutter unit having an outer cutter and an inner cutter and detachably mounted to an upper part of said shaver main body;
    the stepless speed changer provided in said shaver main body and between said cutter unit and said motor, said stepless speed changer varying speed of rotation outputted by said motor and transmitting the varied rotation to said inner cutter; and
    a speed controller provided so as to be manipulated from outside of said shaver main body for adjusting a position of said adjustment belt of said stepless speed changer.

6. The electric shaver according to claim 5, wherein said cutter unit includes a plurality of rotary blade assemblies comprising substantially disk-shaped outer cutters and substantially pinwheel shaped inner cutters that slide against said outer cutters from below, and said output disk of said stepless speed changer drives said inner cutters rotationally.

7. The electric shaver according to claim 5, wherein said cutter unit includes a reciprocal blade assembly comprising an outer cutter that is substantially U-shaped when seen from side thereof and an inner cutter that moves reciprocally to slide against a lower surface of said outer cutter, and said output disk of said stepless speed changer drives said inner cutter reciprocally.

* * * * *